United States Patent [19]

Levien

[11] Patent Number: 5,218,386
[45] Date of Patent: Jun. 8, 1993

[54] EYEGLASSES WITH SPECTRAL COLOR SHIFT

[76] Inventor: Raphael L. Levien, Rte. 1, Box 18, P.O. Box 31 (UPS), McDowell, Va. 24458

[21] Appl. No.: 717,750

[22] Filed: Jun. 19, 1991

[51] Int. Cl.$^5$ .................. G02C 7/10; G02B 27/22; G02B 5/28
[52] U.S. Cl. .................... 351/163; 351/165; 351/177; 359/464; 359/589
[58] Field of Search .............. 351/162, 159, 163, 164, 351/165, 177; 359/589, 466, 464

[56] References Cited

U.S. PATENT DOCUMENTS

| | | | |
|---|---|---|---|
| 3,591,263 | 7/1971 | Esterson | 351/44 |
| 3,877,797 | 4/1975 | Thornton, Jr. | 351/163 |
| 4,134,644 | 1/1979 | Marks et al. | 359/466 |
| 4,247,177 | 1/1981 | Marks et al. | 351/163 |
| 4,654,794 | 3/1987 | O'Brien | 364/413 |
| 5,054,902 | 10/1991 | King | 359/589 |

FOREIGN PATENT DOCUMENTS 2203858 10/1988 United Kingdom .

OTHER PUBLICATIONS

The Measurement of Appearance & 2nd Edition by Richard S. Hunter et al., John Wiley & Sons (Book).

Primary Examiner—Scott J. Sugarman
Attorney, Agent, or Firm—Allan Jacobson

[57] ABSTRACT

The present invention is directed towards a method and apparatus for permitting human perception of more of the spectrophotometric values which define the color of an observed object. A first optical filter, worn over the left eye is provided having a spectral response containing three peaks; one for each of red, green, and blue, tuned to the maximum responsiveness of the human eye to red, green, and blue colors. A second optical filter, worn over the right eye, is similar to the left optical filter, but with the peaks tuned to complementary portions of the visual spectrum. In this manner, a dimension of color perception is added, because each eye sees different colors for the same object which when combined represent the actual color of the object.

9 Claims, 3 Drawing Sheets

LEFT OPTICAL FILTER

RIGHT OPTICAL FILTER

37 ---- RIGHT
31 —— LEFT

EYEGLASSES WITH SPECTRAL COLOR SHIFT

FIELD OF THE INVENTION

This invention relates to the field of optical filters for altering color perception.

BACKGROUND OF THE INVENTION

Color perception is a product of the fact that light is made up of many different wavelengths. Each wavelength, or frequency, of light represents a different color. The color of an object can be defined very precisely, by the percent of reflectance of each respective wavelength of incident light. This measure of a color of an object is known as a spectrophotometric reading. In simple terms, a red object appears red because it reflects relatively more red light than non-red light.

The human eye, however, is not capable of resolving all the levels of color detail. Due to the way that the retina of the eye senses light, the spectrophotometric reading is reduced to three values, one each corresponding to band pass filters in the red, green, and blue areas of the spectrum. In this manner, the human eye is discarding a great deal of the spectrophotometric data when perceiving a particular object color.

It is also known that many color blind persons also see three bands of color, but they are different bands from the normal red, green, and blue areas in normal vision. Therefore, color blind persons and non color blind persons see the world in different colors.

SUMMARY OF THE INVENTION

The present invention is directed towards a method and apparatus for permitting human perception of more of the spectrophotometric values which define the color of an observed object. In accordance with one embodiment of the present invention, a first optical filter is provided having a spectral response curve that selectively admits portions of three bands of light, corresponding to red, green, and blue. The optical filter would be worn over one eye (say, the left eye). The right eye would observe color through a similar optical filter, but with different portions of the three bands admitted.

The two eyes perceive two different shifts in the color of an object relative to the perception of the color of the object by the unaided eye. These shifts are dependent on properties of the spectrophotometric color of the object which are not visible to the unaided eye. Therefore, the eye is capable of an expanded perception of color compared to the unaided eye, because each eye sees different colors of the same scene. This expanded perception is analogous to the added dimension of depth perception because each eye sees perspectives of the same scene.

Specifically, the eyeglasses of the present invention allow the visual perception of up to six bands of color, corresponding to three bands each for the two eyes.

Applications for eyeglasses with spectral color shift include the precise matching of colors of pigments, so that there is a visual match under all lighting conditions. Mixed paints and painted surfaces are often matched by eye. Such matching cannot be done accurately by simple visual match under one type of illumination, because two pigments that match under one type of illumination do not always match under another. If, however, the pigments are matched when viewed both with and without the special filters of the present invention, then the chances are very good that the resulting color will match under nearly all lighting conditions. The tendency for a color to have differing appearance under different lighting conditions is known as metamerism, and the eyeglasses of the present invention might be termed metamerism eyeglasses.

Another application is in the detection of writing or printing that has been altered, as in a forgery. A subtle difference in the original ink and the ink used to make the alteration is likely to be detected when viewed through the filters of the present invention. A future application of the present invention is in the inspection of artworks. It should become possible to distinguish by eye different types of pigments, and even mixtures of pigments, which to the unaided eye are indistinguishable.

In accordance with another embodiment of the present invention, two filters which selectively pass the same portions of the bands corresponding to red, green, and blue are used for both eyes. These portions are chosen so as to increase overall color vividness producing a very striking and dramatic effect. Typically, of two filters that have been designed to produce maximum relative color shifts, one of the two will exhibit this effect to a high degree. A filter of the latter type would also be useful in photography for enhancing the color saturation of the resulting photograph.

DETAILED DESCRIPTION

Figure 1:
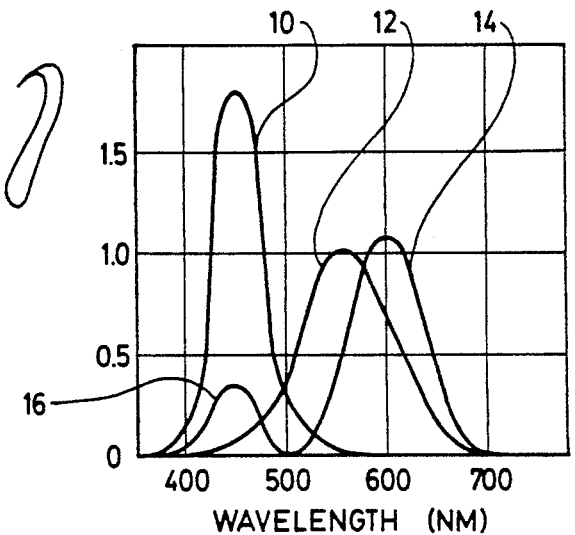
FIG. 1 is a graph illustrating the spectral response of the human eye.

The human eye is not equally sensitive to all colors in the visible spectrum. In fact, the human eye con separate types of light sensing cells, each of which is sensitive to a different band of frequencies within the visible spectrum. As shown in FIG. 1, one type of light sensing cell is sensitive to a narrow band of frequencies 10 having a peak generally in the red region of visible light. Similarly, another type of light sensing cell in the human eye is sensitive to a somewhat broader band of frequencies 12 having a peak generally in the green region of visible light. Finally, still another type of light sensing cell in the human eye is sensitive to a band of frequencies 14 having a peak generally in the red region of visible light, and is also sensitive to lesser degree to a band of frequencies 16 having a peak generally in the violet region of the visible light spectrum. It is noted from FIG. 1 that the human eye is not equally sensitive to all of the frequencies in the visible light spectrum.

Figure 4:
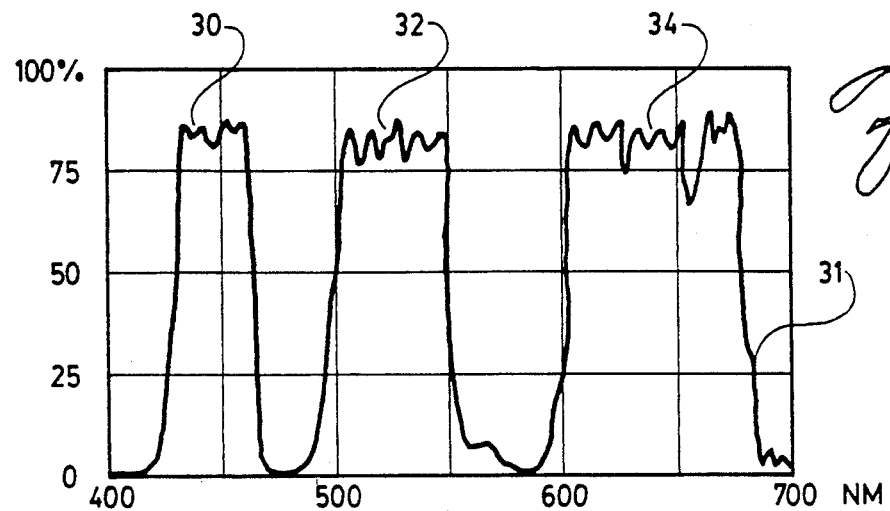
FIG. 4 is a graphical representation of the spectral response of a first filter in accordance with the present invention.
Figure 7:
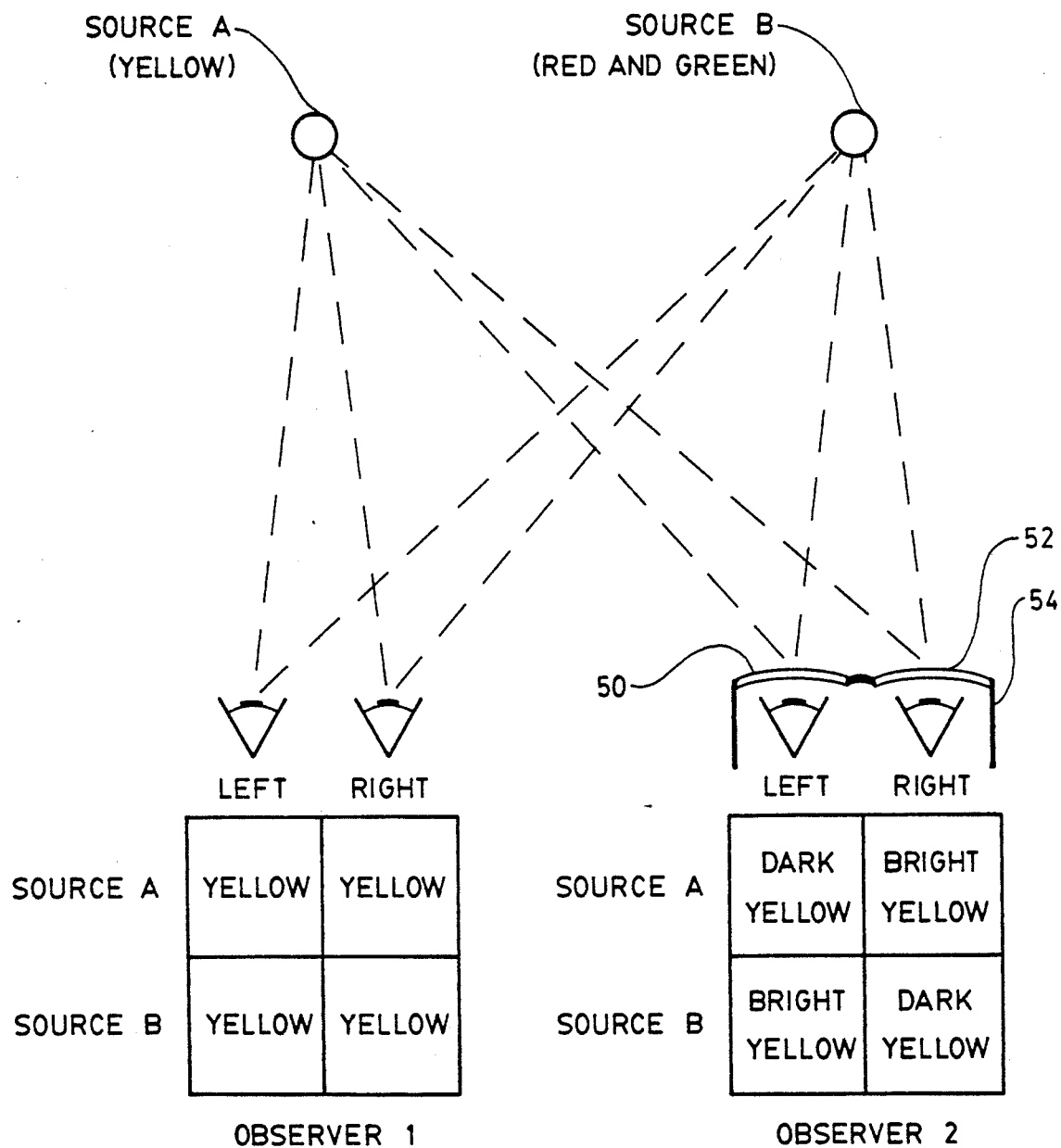
FIG. 7 is a diagram illustrating the difference in color perception between an observe perceiving object color without any special aid, and an observer perceiving object color through optical filters in accordance with the present invention.

As shown in FIG. 7, eyeglasses producing a spectral color shift in accordance with the present invention comprises a frame 54 with means of mounting optical filters 50 and 52. The spectral response of the left optical filter is illustrated in FIG. 4. The spectral response of the right optical filter 52 is shown in FIG. 5.

In FIG. 4, the spectral response 31 of the left optical filter is shown as having three peaks 30, 32, and 34, which are positioned to correspond with the selected portions within the blue, red, and green bands, respectively, of the visible spectrum. That is, spectral response around peak 30 will pass a band of optical frequencies in the 420 to 470 nanometer region of the spectrum, corresponding to the sensitivity of the human eye to blue. Similarly the spectral response around peak 32 will pass a band of optical frequencies in the 500 to 550 nanometer region of the spectrum, corresponding to the sensitivity of the human eye to green. Finally, the spectral response around 34 will pass a band in the 600 to 670 nanometer region of the spectrum, corresponding to the sensitivity of the human eye to red.

The specific portions of the red, green, and blue bands have been chosen to maximize the spectral shifts, as well as the increase in color vividness, while allowing the design to be manufactured without undue difficulty.

Figure 5:
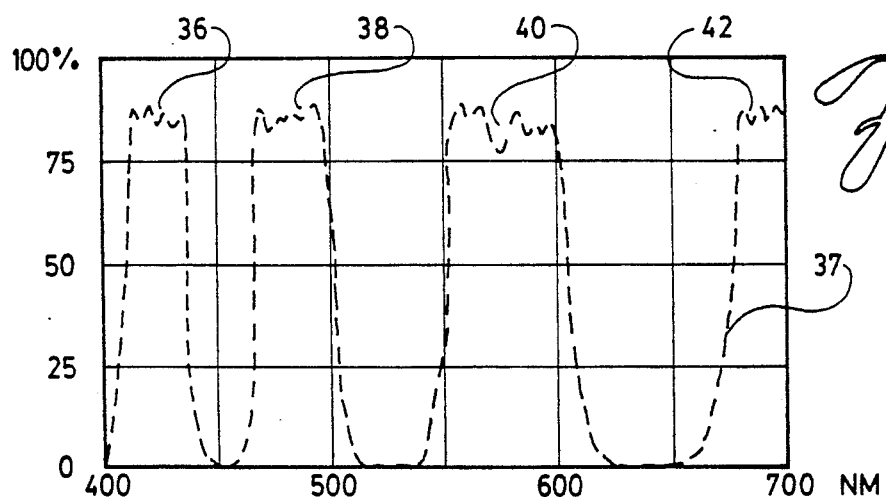
FIG. 5 is a graphical representation of the spectral response of a second optical filter in accordance with the present invention.

In FIG. 5, the spectral response of the right optical filter is shown as having three peaks, 36, 38, and 40, which are positioned to pass complementary portions of the spectrum compared to the left optical filter. That is, the spectral response around peak 36 will pass a band of optical frequencies in the 410 to 430 nanometer region of the blue band of the visible spectrum. Peaks 38 and 40 similarly pass respective bands of optical frequencies, in the 470 to 500 nanometer and 550 to 600 nanometer regions of the green and red bands of the spectrum, respectively.

Figure 6:
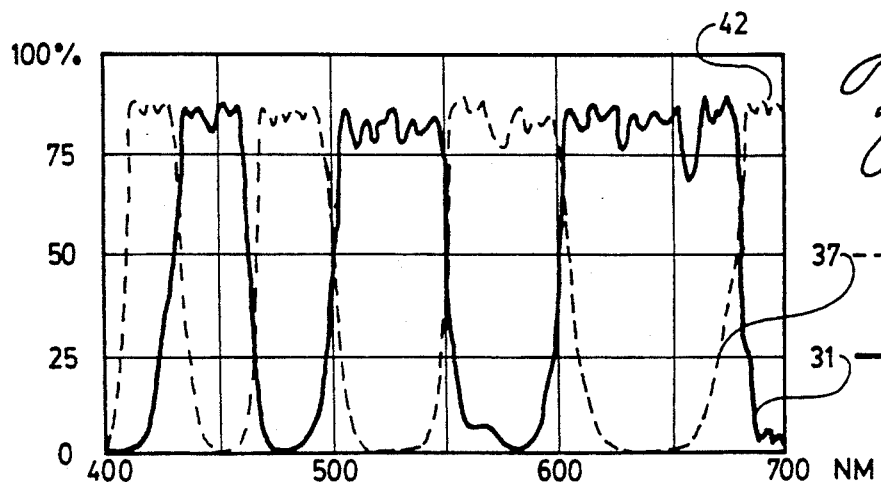
FIG. 6 is a graphical representation of the superimposed optical response of the first and second optical filters in accordance with the present invention.

FIG. 6 illustrates the effect of combining the left spectral curve 31 for the left optical filter and the right spectral response curve 37 for the right optical filter. Note that the peaks of the right spectral curve 37 fill in the valleys of the left spectral curve 31, and vice versa, so that there is a fairly flat response at all optical frequencies. Peak 42 of the spectral response curve 37 fills in the frequency response at the longer wavelengths so that the total combined spectral response of both left and right filters transmits substantially the entire visible light spectrum. Thus, the left and right filters are complementary in that one eye sees some light frequencies while the other eye sees the remaining light frequencies. The resulting received colors are integrated in the human brain, and the effect is to create an additional dimension of visual perception. Although in the present embodiment the spectrum is divided into three or more peaks spaced to correspond to the visible peaks of red, green, and blue, other divisions of the spectrum between left and right filters are possible.

Figure 2:
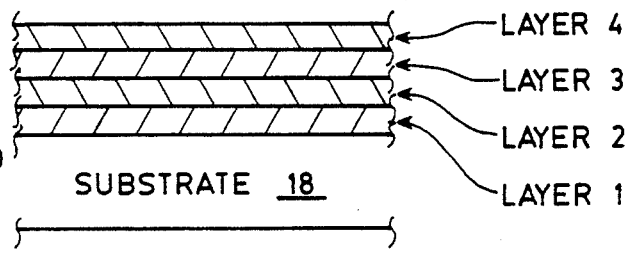
FIG. 2 is a cross-sectional view of an optical filter suitable for use in conjunction with the present invention.
Figure 3:
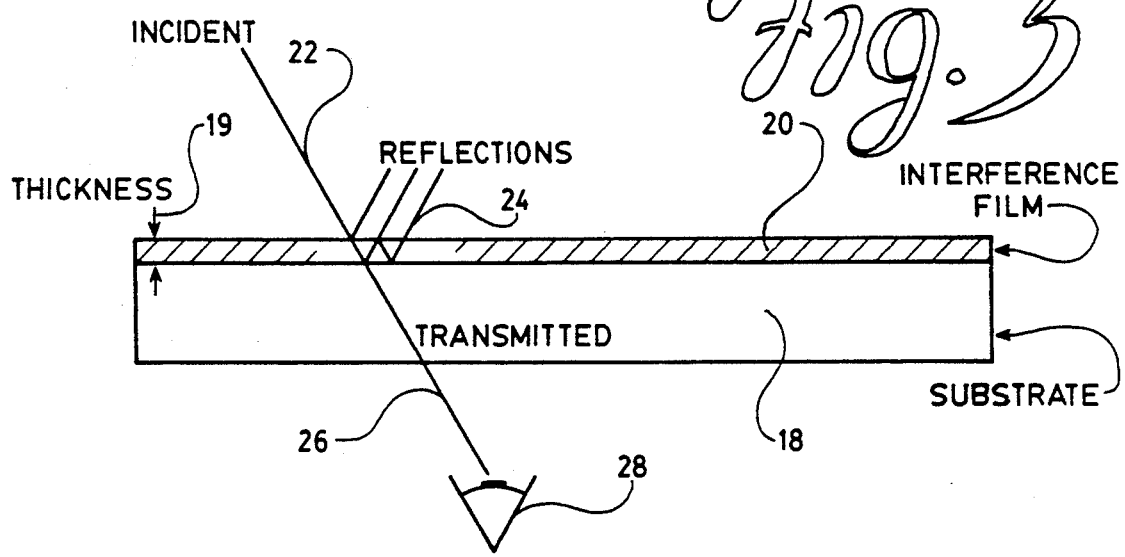
FIG. 3 is a cross-sectional view of an optical filter suitable for use in conjunction with the present invention illustrating the operation of the optical filter.

FIG. 3 is a cross-sectional view of an interference filter suitable for realizing the optical filters used in conjunction with the present invention. A transparent substrate 18 is coated with an interference film 20. The refractive index of substrate 18 and interference film 20 differ, so light will be partially reflected at their mutual boundary. An incident light beam 22 will be partially transmitted 26 to an observer's eye 28, and partially reflected, 24. The relative transmittance versus reflectance varies with the wavelength as a result of constructive and destructive interference of the light waves. The wavelengths that are relatively more and less reflected are determined by the refractive index and thickness 19 of the interference film 20. In order to achieve the desired spectral response, a plurality of layers on substrate 18 are required. The layered structure of the optical filter is shown in FIG. 2, where layer 1 overlays substrate 18. Layers 2, 3, 4, and so on overlie successive layers.

The left optical filter is designed so as to transmit the 420 to 470 nanometer, 500 to 550 nanometer, and 600 to 670 nanometer portions of the visible spectrum, while reflecting all other wavelengths within the visible spectrum. The left optical filter design has the property of increasing overall color vividness, especially reds and greens. A filter of this type would be usable as a filter for photographers to place before the lens to enhance the color of the resulting photograph.

The right optical filter can be achieved by multiplying all the values for the thicknesses of the layers in the left optical filter by a factor of 1.105. Such a design would transmit light in the 410 to 430 nanometer, 470 to 500 nanometer, 550 to 600 nanometer, and 670 to 700 nanometer portions of the visible spectrum, while reflecting all other wavelengths within the visible spectrum. The right optical filter has the effect of reducing color saturation. A reference on the technique of constructing thin film stack filters may be found in "Thin Film Optical Filters", by H. A. MacLeod, Adam Hilger Ltd., London, England (1969).

Color vividness refers to the perceived brilliance of color. Gray shades have no vividness at all, whereas light of a single wavelength, such as laser light, has the maximum vividness.

Similarly, visual neutrality is a lack of color vividness. White light is a light with a very small value of color vividness. An important design characteristic of the filters of the present invention is that they are visually neutral to white light. That is, filtration of white light by the filters of the present invention will not cause a significant change in color vividness.

The purpose of the present invention is to affect human perception of colors. However it is possible to objectively measure the color shifts with a device such as a colorimeter.

FIG. 7 illustrates how two different observers perceive color objects differently. Assume that source A emits pure light with a yellow wavelength, midway between green and red, as would be obtained from sodium lamp. Source B is a mixture of pure red and green (as would be obtained from two lasers). To the unaided eye, observer 1 sees the same yellow color from both sources. However, observer 2 viewing source A and source B through optical filters 50 and 52 will not see source A and source B as being the same color. The left eye of observer 2 sees source A as very much darker, while the right eye sees source A considerably brighter. So, therefore, the two eyes see things differently which results in a yellow color with a special sparkling effect. Source B, on the other hand, will appear very bright to the left eye, and very dark to the right eye of observer 2. Therefore, with the eyeglasses 54 on, observer 2 can see the difference between source A and so B. The difference is a perception of another dimension of color which is manifested as a kind of sparkling. On the other hand, observer 1 would not be able to distinguish any difference between source A and source B.

What is claimed is:

1. Eyeglasses with spectral color shift comprising:
   first optical filter means visually neutral to white light for causing first visual color shifts by passing first optical wavelengths and blocking second optical wavelengths;
   second optical filter means visually neutral to white light for causing second visual color shifts by passing third optical wavelengths and blocking fourth optical wavelengths, wherein at lest some of said second visual color shifts of said second optical filter are different from said first visual color shifts of said first optical filter;
   a frame having first and second means for supporting said first and second filter means, respectively; and
   wherein each of said first and second visually neutral optical filters is a filter having a spectral response curve for which multiplying said spectral response curve by the CIE Standard Observer response curve for red, and integrating the result to produce a total value for perceived red light, and multiplying said spectral response curve by the CIE Standard Observer response curve for green, and integrating the result to produce a total value for perceived green light, and multiplying said spectral response curve by the CIE Standard Observer response curve for blue, and integrating the result to produce a total value for perceived blue light, provides repressive total values for said perceived red, green and blue light which are substantially equal to each other, and
   wherein substantially all visible spectra between said first, second, third and fourth optical wavelengths are transmitted by one of either said first optical filter or said second optical filter.

2. Eyeglasses in accordance with claim 1, wherein said first optical filter means comprises:
   means for passing a band of optical frequencies having wavelengths contained in the center of the band of wavelengths substantially between 600 to 670 nanometers, corresponding to the sensitivity of the human eye to red;
   means for passing a band of optical frequencies having wavelengths contained in the center of the band of wavelengths substantially between 500 to 550 nanometers, corresponding to the sensitivity of the human eye to green; and
   means for passing a band of optical frequencies having wavelengths contained in the center of the band of wavelengths substantially between 420 to 470 nanometers, corresponding to the sensitivity of the human eye to blue.

3. Eyeglasses in accordance with claim 2, wherein said second optical filter means comprises:
   means for passing a band of optical frequencies having wavelengths substantially contained in the periphery of the band of wavelengths between 600 to 670 nanometers;
   means for passing a band of optical frequencies having wavelengths substantially contained in the periphery of the band of wavelengths between 500 to 550 nanometers; and
   means for passing a band of optical frequencies having wavelengths substantially contained in the periphery of the band of wavelengths between 420 to 470 nanometers.

4. Eyeglasses with spectral color shift in accordance with claim 1, wherein said second optical filter means visually neutral to white light for causing second visual color shifts by passing third optical wavelengths and blocking fourth optical wavelengths, is substantially complementary to said first optical filter means visually neutral to white light for causing first visual color shifts by passing first optical wavelengths and blocking second optical wavelengths.

5. A method for altering color perception in a viewer comprising:
   optically filtering light so as to cause first visual color shifts visually neutral to white light by passing first optical wavelengths and blocking second optical wavelengths;
   optically filtering light so as to cause second visual color shifts visually neutral to white light by passing third optical wavelengths and blocking fourth optical wavelengths, wherein at least some of said second visual color shifts are different from said first visual color shifts;
   viewing said first optically filtered received light by one eye of said viewer;
   viewing said second optically filtered received light by the other eye of said viewer; and
   wherein each of said steps of optically filtering light so as to cause said first and second visual color shifts visually neutral to white light, include passing said light through an optical filter having a spectral response curve for which multiplying said spectral response curve b the CIE Standard Observer response curve for red, and integrating the result to produce a total value for perceived red light, and multiplying said spectral response curve by the CIE Standard Observer response curve for green, and integrating the result to produce a total value for perceived green light, and multiplying said spectral response curve by the CIE Standard Observer response curve for blue, and integrating the result to produce a total value for perceived blue light, provides respective total values for said perceived red, green and blue light which are substantially equal to each other, and
   wherein substantially all visible spectra between said first, second, third and fourth optical wavelengths are transmitted by one of either said step of optically filtering light so as to cause said first visual color shifts or said step of optically filtering light so as to cause said second visual color shifts.

6. A method for altering color perception in accordance with claim 5, wherein said step of optically filtering received light so as to cause said first visual color shift comprises:
   passing a band of optical frequencies having wavelengths substantially between 600 to 670 nanometers contained in the center of the band of wavelengths corresponding to the sensitivity of the human eye to red;
   passing a band of optical frequencies having wavelengths substantially between 500 to 550 nanometers contained in the center of the band of wavelengths corresponding to the sensitivity of the human eye to green; and
   passing a band of optical frequencies having wavelengths substantially between 420 to 470 nanometers contained in the center of the band of wavelengths corresponding to the sensitivity of the human eye to blue.

7. A method for altering color perception in accordance with claim 5, wherein said step of optically filtering received light so as to cause said second visual color shift comprises:

passing a band of optical frequencies having wavelengths substantially contained in the periphery of the band of wavelengths between 600 to 670 nanometers;

passing a band of optical frequencies having wavelengths substantially contained in the periphery of the band of wavelengths between 500 to 550 nanometers; and passing a band of optical frequencies having wavelengths substantially contained in the periphery of the band of wavelengths between 420 to 470 nanometers.

8. A method in accordance with claim 5, wherein said step of optically filtering light so as to cause second visual color shifts visually neutral to white light by passing third optical wavelengths and blocking fourth optical wavelengths, is substantially complementary to said step of optically filtering light so as to cause first visual color shifts visually neutral to white light by passing first optical wavelengths and blocking second optical wavelengths.

9. A method for altering color perception in a viewer of a first object and a second object, of which the color of said first object and the color of said second object are visually indistinguishable to the unaided eyes, comprising:

optically filtering light from said first object and said second object so as to cause a first color shift; optically filtering light from said first object and said second object so as to cause a second color shift, said first and second color shifts each being visually neutral to white light, said second color shift being visually distinguishable from said first color shift; viewing said first optically filtered light by one eye of said viewer; and viewing said second optically filtered light by the other eye of said viewer; and wherein each of said steps of optically filtering light form said first object and said second object so as to cause said first and second color shifts each being visually neutral to white light, include passing said light through an optical filter having a spectral response curve for which multiplying said spectral response curve by the CIE Standard Observer response curve for red, and integrating the result to produce a total value for perceived red light, and multiplying said spectral response curve by the CIE Standard Observer response curve for green, and integrating the result to produce a total value for perceived green light, and multiplying said spectral response curve by the CIE Standard Observer response curve for blue, and integrating the result to produce a total value for perceived blue light, provides responsive total values for said perceived red, green and blue light which are substantially equal to each other, and wherein substantially all visible spectra between said first and second color shift optical wavelengths are transmitted by one of either said step of optically filtering light so as to cause said first visual color shifts or said step of optically filtering light so as to cause said second visual color shifts.

* * * * *